United States Patent
Schmidt et al.

(10) Patent No.: US 11,659,809 B2
(45) Date of Patent: May 30, 2023

(54) METHOD FOR REDUCING THE INDIVIDUAL-SPECIFIC MILK PRODUCTION OF MILK-PRODUCING ANIMALS

(71) Applicant: GEA Farm Technologies GmbH, Bönen (DE)

(72) Inventors: Susanne Schmidt, Arnsberg (DE); Brigitte Linius, Ennigerloh (DE); Beate Maassen-Francke, Oelde (DE); Ute Müller, Rheinbrohl (DE); Wolfgang Büscher, Bonn (DE); Lisett Marie Martin, Troisdorf (DE)

(73) Assignee: GEA Farm Technologies GmbH, Bönen (DE)

( * ) Notice: Subject to any disclaimer, the term of this patent is extended or adjusted under 35 U.S.C. 154(b) by 84 days.

(21) Appl. No.: 16/644,255

(22) PCT Filed: Sep. 6, 2018

(86) PCT No.: PCT/EP2018/073948
§ 371 (c)(1),
(2) Date: Mar. 4, 2020

(87) PCT Pub. No.: WO2019/048521
PCT Pub. Date: Mar. 14, 2019

(65) Prior Publication Data
US 2020/0281151 A1    Sep. 10, 2020
US 2020/0281151 A1    Sep. 10, 2020

(30) Foreign Application Priority Data

Sep. 7, 2017 (DE) .................. 10 2017 120 656.6

(51) Int. Cl.
*A01J 5/007* (2006.01)
*A01K 1/12* (2006.01)
(Continued)

(52) U.S. Cl.
CPC .............. *A01J 5/007* (2013.01); *A01J 5/017* (2013.01); *A01K 1/12* (2013.01); *A01K 11/006* (2013.01); *A01J 5/013* (2013.01)

(58) Field of Classification Search
CPC .. A01J 5/007; A01J 5/01; A01K 13/00; A01K 1/12; A01K 1/006; A01K 1/123; A01K 1/126
See application file for complete search history.

(56) References Cited

U.S. PATENT DOCUMENTS 5,996,529 A * 12/1999 Sissom ..................... A01J 5/01
119/14.14
6,571,730 B1 * 6/2003 Norberg ................. A01K 29/00
119/14.03
(Continued)

FOREIGN PATENT DOCUMENTS

CA    3073874 A1    3/2019
DE    2844562 B1    10/1979
(Continued)

OTHER PUBLICATIONS

Kelton, Deciding_to_dry-offDoes_level_of_production_matter, 2001, National Mastitis Council Annual Meeting Proceedings, p. 3 (Year: 2001).*

(Continued)

*Primary Examiner* — Magdalena Topolski
*Assistant Examiner* — Katherine Anne Kloecker
(74) *Attorney, Agent, or Firm* — BainwoodHuang

(57) ABSTRACT

Methods and apparatus for milking a milk-producing animal, in particular a cow, that set a target milk quantity which is lower than a possible expected milk quantity, carry out the milking process, determine the milked quantity and compares the milked quantity with the target milk quantity, and (Continued)

terminate milking when the milked quantity corresponds substantially to the target milk quantity.

20 Claims, 2 Drawing Sheets

(51) Int. Cl.
  *A01K 11/00* (2006.01)
  *A01J 5/017* (2006.01)
  *A01J 5/013* (2006.01)

(56) References Cited

U.S. PATENT DOCUMENTS

| | | | | |
|---|---|---|---|---|
| 2014/0116341 | A1* | 5/2014 | Kopic | A01K 29/00 119/14.02 |
| 2018/0303866 | A1* | 10/2018 | Brown | A61K 31/43 |
| 2020/0281151 | A1 | 9/2020 | Schmidt et al. | |

FOREIGN PATENT DOCUMENTS

| | | | | |
|---|---|---|---|---|
| DE | 3609275 | A1 | 9/1987 | |
| DE | 19521569 | A1 | 1/1997 | |
| DE | 112004000810 | | 3/2002 | |
| DE | 112004000810 | T5 * | 3/2006 | ........... G06Q 10/063 |
| DE | 202008004031 | * | 3/2008 | ............. A01J 5/048 |
| DE | 202008004031 | | 8/2008 | |
| DE | 102017120656 | A1 | 3/2019 | |
| EP | 0534565 | B1 | 9/1998 | |
| EP | 1123651 | | 8/2001 | |
| EP | 1123651 | A2 * | 8/2001 | ................ A01J 5/01 |
| EP | 1125492 | A2 | 8/2001 | |
| EP | 1125492 | | 12/2003 | |
| SE | 1051337 | A1 * | 12/2010 | ............ A01J 5/0175 |
| SE | 1051337 | | 1/2011 | |
| WO | 9903330 | | 1/1999 | |
| WO | 2006068568 | | 6/2006 | |
| WO | 2006068568 | A1 | 6/2006 | |
| WO | 2019048521 | A1 | 3/2019 | |

OTHER PUBLICATIONS

International Search Report for PCT Application No. PCT/EP2018/073948, dated Nov. 22, 2018, 2 pages.
"Short textbook milk science and milk hygiene" MVS Medizinverlage Stuttgart GmbH & Co. KG , Germany, Jan. 2007, 9 pages.
Wayne, Ralph et al.; "Drying up Cows and the Effect of Different Methods Upon Milk Production"; date of citation Apr. 25, 2022.
R.A. Abou-Saleh et al.; "Drying off Methods, Parity and Stage of Lactation Influences On Milk Production, Milk Composition and Some Blood Plasma Parameters in Holstein Friesian Cows"; date of citation Apr. 25, 2022.

* cited by examiner

METHOD FOR REDUCING THE INDIVIDUAL-SPECIFIC MILK PRODUCTION OF MILK-PRODUCING ANIMALS

CROSS REFERENCE TO RELATED APPLICATION

This application is a national phase application under 35 U.S.C. 371 of PCT Application No. PCT/EP2018/073948, filed Sep. 6, 2018, which claims priority to German Application No. 10 2017 120 656.6, filed Sep. 7, 2017, the disclosures of which are incorporated by reference herein.

FIELD AND BACKGROUND OF THE INVENTION

The invention relates to a method for milking a milk-producing animal, especially a cow, and to an apparatus suitable and intended for carrying out the method.

Although hereinbelow the invention is described in connection with a milking installation for the milking of cows, it is pointed out that the subject matter of the invention is suitable especially also to methods and apparatuses for milking sheep, goats, lamas, camels, dromedaries, buffalos, mares, donkeys, yaks and other milk-producing animals. The invention can be used both in robot-assisted milking installations and in fully automatic, semiautomatic or conventional milking installations.

Both in the case of traditional hand milking, which is a milking by pressure, and in the case of machine suction-milking methods, the entire amount of milk present in the udder is milked in order to obtain a maximal yield and in order to stimulate the udder for further milk production.

In the case of machine milking, there is the risk that teats are milked for too long, even though there is no more milk flow, the teat is twisted or bent and releases no milk at all, or the milk-guiding canals in the teats are closed too early owing to unfavorable circumstances. It is known that milking an animal dry to an excessively severe extent can lead to an impairment of the conditions of the teats. In particular, there is the risk of hyperkeratoses (teat canal washouts).

Different methods are known for preventing such adverse effects when an animal is completely milked dry. For example, DE 36 09 275 A1 suggests that the change in milk quantity and/or in milk flow over time within individual pulse cycles has characteristic peculiarities which can be assessed. This means that milking parameters can be adjusted via the control system or the end of milking can be determined, so that that the milking control system can execute cluster removal. EP 0 534 565 B1 discloses a method for automatic milking that monitors the milk flow from the individual teats using flow sensors and that ends the milking of the teats when the milk flow runs dry. DE 28 44 562 B1 describes a further method for completely milking an animal dry in the case of machine milking. When the milk flow drops below a certain threshold, the removal of the cluster is effected.

In view of the fact that milking yield and milk composition changes in the course of a lactation, a cow is dried off to prepare for the following lactation. A dry-off is understood to mean the transition from the lactating phase to a nonlactating phase. During the dry period, there is essentially no milking, since the animal is to be given the opportunity to achieve a regeneration of the reserves for the next start of lactation.

It has been found that a rate of new infection with mastitis can be very high especially in the case of animals with high milk production and high daily milking output at the time of dry-off (Volker Kromker; Kurzes Lehrbuch Milchkunde and Milchhygiene [Concise textbook of milk science and milk hygiene]; Parey in MVS Medizinverlage Stuttgart; 2007). To reduce the risk for udder health, use is made of long-term antibiotic preparations, which are also known as so-called dry-off agents. Through the use of long-term antibiotic preparations in particular, which can also be given to animals preventively, it is possible to at least reduce problems with udder health.

On the other hand, unpasteurized milk is a significant foodstuff and an important raw material for the food industry. For consumer protection, for technical processability and for market control, unpasteurized milk must satisfy both national and international quality requirements. If an animal is being treated with medication, the milk from the animal during the medication treatment and within a specified period of time after the end of the medication treatment must not be classified as marketable milk. In addition, the widespread use of antibiotics promotes resistances in bacterial strains throughout the environment.

SUMMARY OF THE INVENTION

Proceeding from this, the objective underlying the present invention is that of specifying an improved method for milking a milk-producing animal, especially a cow.

The individual features described herein are combinable with one another in any technologically meaningful manner and can be supplemented by explanatory facts from the description, revealing further variants of the invention.

As per the method according to the invention for milking a milk-producing animal, especially a cow, what is proposed is that a target quantity of milk is determined. This target quantity of milk is smaller than a possible quantity of milk to be expected. During the milking operation, the milked quantity of milk is ascertained. A comparison is made between the milked quantity of milk and the target quantity of milk. The milking operation is ended when the milked quantity of milk substantially corresponds to the target quantity of milk. This can be effected by an automatic removal control system, or manually by milking personnel who are supervising the milking operation by machine or are carrying out hand milking.

The method according to the invention achieves especially a gentle treatment of the teats of an animal, especially a cow.

The method is especially advantageous in connection with the introduction of a dry period for a cow. Thus, what is proposed is that a start day, which is before a dry-off day, is determined and, from that day, the milking operation is ended when a target quantity of milk has been milked. Through this preferred configuration of the method, an involution of the mammary gland is actively introduced. This active operation facilitates the dry-off of the milk-producing animal, and it is possible in particular to essentially dispense with the use of antibiotic dry-off preparations.

Preferably, the target quantity of milk at least for the start day is ascertained from historic data. It is known that modern dairy farms have a herd management system. Stored in the management system are numerous data which are attributed to individual animals or animal groups. If the dairy farm has such a herd management system, then animal-specific data in particular are available. The data can be data from which it is possible to identify what milk yield has been produced by an animal on a specific lactation day. On the basis of such a data set containing the historic data, it is possible to ascertain the target quantity of milk at least for the start day. The historic data preferably contain all milking-relevant data.

There is also the possibility of ascertaining the target quantity of milk at least for the start day from historic data without, in this case, the historic data absolutely needing to be animal-specific. The quantity of milk that is produced by an animal of a specific breed, physical condition, etc., is in itself well-known and can be postulated as the basis for the determination or ascertainment of the target quantity of milk for the start day.

As per the method according to the invention, if an animal is milked during a lactation, these data, especially the milk yields per milking operation or per milking yield, are saved. These saved data are also historic data. As per the method according to the invention, if the animal is milked in a further lactation, it is possible to have recourse to the historic data from at least one prior lactation. If necessary, a correction of the historic data is made depending on what lactation the animal is in. For example, if it is known that the milk yield during lactation constantly decreases after the second, third or further calving, a correlation can be made between the historic data and the further calvings or further lactations in order to estimate more accurately the quantify of milk present in the udder as expected or to calculate more accurately the reduced target quantity of milk.

If the method is carried out for an animal which is lactating after the first calving, recourse is had to historic data from comparable animals.

The historic data can also be data relating to milking operations prior to the current lactation.

The target quantity of milk for each individual milking operation is preferably determined, of which each animal generally has several per day. This approach is especially advantageous when the animal is milked at exactly specified times of the day.

If the animal is kept on a dairy farm in which free animal movement is practiced, it is advantageous when the target quantity of milk for each day is defined. In the case of free animal movement, it is not guaranteed that an animal is milked at the same time on each day. This is especially the case when the animals can voluntarily visit robot-assisted milking devices. If this is the case, the quantity of milk available in the udder varies depending on the time interval between two successive milking operations.

In the case too of managed animal movement with planned milking times, which predefine in each case only a time window, it is not possible to exactly predict the time of a milking operation of a specific animal. It is then likewise advantageous when the target quantity of milk for each day is defined.

Advantageously, the target quantity of milk for an entire day is ascertained according to various use cases and methods and a target quantity of milk for an individual milking operation is derived therefrom. This is preferable especially in the case of free animal movement or in the case of a milking time being specified as a time window. If the target quantity of milk (ZMM) for an individual milking is determined on the basis of a daily target quantity of milk (TZM), it is advantageous when the time interval (S) between two successive milking operations is taken into account. For example, the target quantity of milk can be calculated from the product of the daily target quantity of milk and the quotient of the time between two successive milking operations per 24 hours. The target quantity of milk is:

$$ZMM=TZM*(S[h]/24[h])$$

In view of the fact that milk production in the udder cannot increase unendlessly since a last milking, it is proposed that the period since the last milking operation be limited to a maximum value for the calculation of the target quantity of milk for an individual milking. Such a situation may, for example, occur when there has been an incomplete data acquisition for an animal and the last milking operation recorded is not the actual last milking operation. For example, if it is found that, depending on the planned milking frequency, i.e., the number of milking operations per 24 hours, a specified time interval in relation to a preceding known milking operation far exceeds the maximum value, it is possible to use an assumed time interval between two successive milking operations in order to determine the target quantity of milk per day based on the daily target quantity of milk, with account being taken here of the planned milking frequency, i.e., the number of planned milkings per day.

Preferably, the values reproduced in the table below are assumed in this case:

| Planned milking frequency | Time interval in relation to a last-known milking operation | Assumed time interval |
| --- | --- | --- |
| 1 | 36 h | 24 h |
| 2 | 24 h | 12 h |
| 3 | 16 h | 8 h |
| 4 | 12 h | 6 h |

For example, if according to the table an animal is to be milked twice a day (planned milking frequency), which corresponds to an assumed time interval of 12 hours per day, and it has been found that more than 24 hours have passed between two successive milking operations, what is assumed for the determination of the target quantity of milk for the pending milking is a time interval of 12 hours between two successive milking operations, even though the actual time interval may be smaller or greater.

This procedure is especially advantageous when the animal to be milked is identified before a milking operation.

In a yet further advantageous configuration of the method according to the invention, what is proposed is that the start day for milking with a reduced target quantity of milk is defined depending on the planned dry-off day for an animal. The planned dry-off day is determined in an animal-specific, farm-specific or breed-specific manner from the number of days since the day of insemination or the mating event for which pregnancy has been established in a later pregnancy examination. The start day for milking with a reduced target quantity of milk is a specific number of days before the planned dry-off day, which number is animal-specific, farm-specific or breed-specific. The extent of the change in target quantity of milk can be attuned to the period of time between start day and planned dry-off day.

In particular, it is proposed that the target quantity of milk of one day is determined from the target quantity of milk of the previous day minus a change value M. The previous-day value to be reduced on the start day itself, referred to hereinafter as reference quantity, can be the average daily milk production of the animal, calculated from the quantities of milk from historically recorded milking operations or as per the already presented methods for estimation according to lactation day and lactation curve or estimation methods using earlier lactation outputs or using comparable animals. All values can also be determined in a teat-specific manner.

The change value M can be a constant value which is subtracted for each day. Preferably, it is ascertained by a factor K from the previous-day value, or from the ascertained reference quantity on the start day. The factor K for a reduction of quantity must be smaller than 1. For later presented milking applications with limited target quantity of milk, where a stepwise increase is desired, it can have other values. Change value M or factor K are preferably constant and adjustable. In particular, what is proposed is that they are variables dependent on a period of time between start day and dry-off day and/or lactation state. This achieves a yet better attunement of the target quantity of milk and of the associated mammary-gland involution striven for. The reduction can also take other influencing factors into account, especially also breed, physiognomy and animal-specific state of health. The attunement can be done in a linear or asymptotic manner following a specific target value.

In a yet further advantageous further development of the method, what is proposed is that the animal is subjected to at least one complete milking operation toward the end of the lactation period. What is to be achieved as a result is that the udder of the animal is also actually completely milked dry on the dry-off day.

The method according to the invention is not only advantageous in connection with the animal dry-off striven for, but it also takes into account of being able to achieve an improved animal health and especially an improved energy balance. It is known that the animal for milk production must expend a certain amount of energy. To provide the energy, the animal is supplied with appropriate nutrients in an optimal quantity. The animal should not become excessively fat, since difficulties in the calving which follows can occur. An excessively high protein input leads to metabolic and health problems in the animal. Especially in the case of high milk production, it is often difficult in the case of a rapid rise in milk production, especially after calving in an early stage of lactation, to establish an equilibrium between an adequate feeding and milk production. A rapid change in the quantity of feed does not lead to the desired result, since the digestive system constantly has to adapt to the changed quantity. There is the risk of digestive disorders occurring when the quantity of feed becomes excessively high. In the case of a rapid rise in milk production, a deficit in the amount of energy supplied therefore arises, and there is the risk of a ketosis disorder.

Furthermore, the quantity of concentrated feed cannot be increased as desired, since the digestive system requires a certain minimum proportion of raw fibers in relation to the amount of energy absorbed, and so there are limits due to the volume of the entire feed. In the case of cows, there is therefore the risk of a negative energy balance occurring, which adversely affects the immune system and fertility.

As per the method according to the invention, there is therefore also the possibility of influencing the rise in milk production, especially at the start of the lactation period. If the target quantity of milk is below the possible milkable quantity of milk, production is reduced. The stimulus for the cow to increase milk production is reduced, and this can have a positive effect on the total energy balance and thus for the health of the animal too.

The method according to the invention can also be used for a specific period of time during the lactation period. This achieves, for example, a curbing of milk production during the lactation. The achieved curbing of the milked quantity of milk and associated reduction in milk production in the animal is especially advantageous when the animal has a health impairment. A curbing of milk production relieves the metabolism of the animal, and this can lead to strengthening of the immune system and thus to an improvement in the animal's state of health.

The milking apparatus comprises a milking device. In particular, the milking device is a robot-assisted milking device. The milking apparatus comprises furthermore an animal identifier. The animal identifier can be conventional, known means for animal identification. The milking apparatus comprises furthermore a collector for milk milked during a milking operation. Furthermore, a control device which is suitable and programmed for controlling the milking device according to the invention is provided.

In particular, the control system comprises a computer comprising a memory containing a computer program stored therein and a digital processor.

According to a yet further inventive concept, what is proposed is a computer program product which is intended and set up for carrying out the method described herein.

Furthermore, a machine-readable storage medium on which a computer program product is saved is proposed.

Further advantages and details of the invention will be elucidated on the basis of the exemplary embodiment depicted in the drawing, without the subject matter of the invention being restricted to the exemplary embodiment.

DETAILED DESCRIPTION OF THE INVENTION

Figure 1:
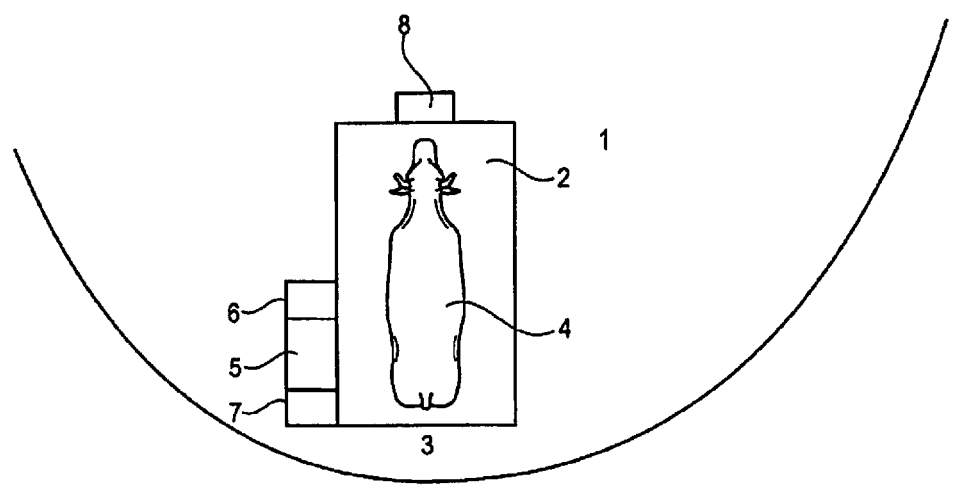
FIG. 1: shows schematically a milking apparatus for carrying out the method according to the invention

FIG. 1 shows schematically a milking area 1 with a milking place 2. The milking place 2 is entered and excited by the animal 4 via the entrance area 3.

An animal identifier 8 is provided in the region of the milking place 2, in the head area of the milking place in the exemplary embodiment depicted. The individual animals are subjected to an identification therewith. The animal identifier 8 preferably operates contactlessly. It comprises especially a sender unit and/or receiving unit. By means of the animal identifier 8, the animal identifier which is worn by the animals and in which animal-specific parameters or data are stored are read and transferred to, for example, a herd management system. The herd management system is also connected by signals to a control device 6 for controlling the milking device 5 at the milking place 2. The herd management system can also be part of the control device 6. However, it is not imperative that a herd management system has to be present, but it is advantageous when the system is provided. The arrangement of the animal identifier in the head area of the milking place is one embodiment. For example, they can also be arranged in the region of the corridor to the milking place. During a milking operation by a milking device 5, the milked quantity of milk is captured by a milk collector 7.

If an animal 4 enters the region of the milking place 2, the animal is identified by the animal identifier 8. The identification information is preferably passed to a herd management system. If it is stored in the herd management system and the corresponding signal that a milking operation is to be carried out on the specific animal 4 has been sent to the control device 6, then the teat cups, which are not depicted, are fitted to the teats of the animal and the milking operation is carried out.

What is also stored in the herd management system is whether the animal is to be milked following a milking operation in line with the method according to the invention. If this is the case, this is communicated to the control device 6 before the start of the milking operation. During the milking operation, the milked quantity of milk is ascertained. In the case of the animals which are to be milked using the method according to the invention, what takes place is preferably a continuous comparison of the milked quantity of milk with a target quantity of milk preferably determined in an animal-specific manner. If the milked quantity of milk substantially corresponds to the target quantity of milk, the milking operation is ended. To ensure animal welfare and to prevent milking that is harmful to the health of the animal, it is possible to define additionally termination criteria which initiate an end to milking before the target quantity of milk is reached.

The procedure according to the invention can also be used for milking operations during the lactation period, wherein the target quantity of milk is dependent on the lactation state of the animal. In particular, the method according to the invention is used in connection with the animal dry-off striven for.

Figure 2:
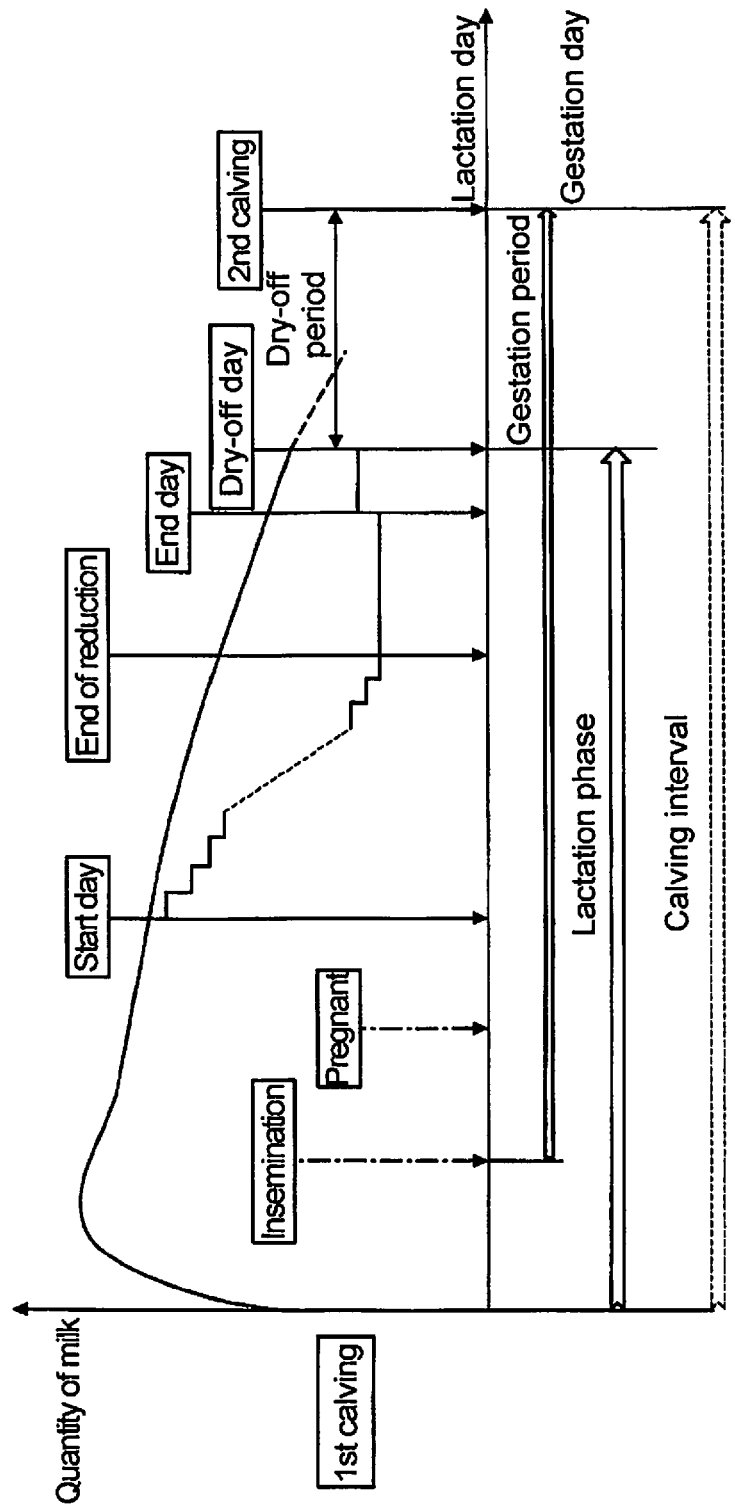
FIG. 2: shows schematically a course of a milk production over time.

FIG. 2 shows a schematic course of the milk production during a lactation as a function of time. A lactation is the period of time after a calving. The zeroth lactation day is the day of calving. The lactation days are calculated from then on. Just after a calving, an animal has the highest level of milk production. In the course of a lactation, an animal produces increasingly less milk, and this is evident from the falling profile of the curve. The milk flow (kilograms per minute) becomes increasingly smaller here.

During the lactation, at least one insemination of the animal takes place. In a pregnancy examination, it is determined whether the animal is pregnant and which insemination was successful. The zeroth gestation day is the day of insemination. The days, calculated from that day on, are also called gestation days for the animal. Before the next calving, what generally takes place is a dry-off of the animal. From the dry-off day, the animal is no longer milked for some days before the next calving. This dry-off period leads to an improvement in the energy balance of the animal, with the result that there is a heathier situation in the calving and the start of the next lactation. Lactation number refers to the number relating to how often an animal has already calved.

The course of the milk production that is depicted in FIG. 2 may vary for different animals. The course may also be variable depending on the lactation number of an animal.

It can be seen from the course depicted in FIG. 2 that milk production is dramatically reduced to zero on the dry-off day, due to the fact that no more milking operations are being carried out from the dry-off day. According to the methods to date, the udder of an animal is milked empty during the lactation. Owing to milking until empty, the udder is maximally stimulated to produce further milk, meaning that a theoretical further course of the lactation would be possible, as depicted above in FIG. 2 by dashed lines in the dry-off period.

As per the method according to the invention, an animal is milked with the milking operation ending once a specified target quantity of milk has been reached or if the classic removal methods take effect first in the interests of animal welfare.

If the dry-off day is known, milking is carried out with a target quantity of milk from a start day, which is before a dry-off day. The target quantity of milk is a quantity of milk that is smaller than a possible achievable quantity of milk. The target quantity of milk at least for the start day is ascertained from historic data. To this end, it is possible to have recourse to suitable methods, especially methods of estimation. If the animal is milked as per the method according to the invention and the target quantity of milk in the course of the days is reduced, milk production and internal udder pressure on the dry-off day are so low that the use of antibiotics becomes unnecessary or is used at least in a considerably lower amount. The method promotes the involution of the mammary glands. The slow decrease in milk production also leads to a gentler change in the necessity for feeding, which the animal no longer requires so much energy from the feed for milk production. The animal thus does not get so easily into an energetic imbalance.

FIG. 2 depicts schematically the course of the target quantity of milk between start day and end of reduction. The animal is milked with the target quantity of milk from a start day, which is preferably defined according to the dry-off day. Up to the start day, the animal is milked according to the classic milking method. With the start day, the average daily quantity of milk from the animal is preferably calculated from the historic recorded milking quantities of the preceding days. Preferably, the milking quantity of the preceding 7 (seven) days is taken into account. Using the historic data, a first reduction step is performed, which defines the target quantity of milk to be achieved on the start day.

The target quantity of milk for an individual milking operation is calculated from the daily target quantity of milk and from the time which has passed since the previous milking, it being possible to assume an estimated value if the interval in relation to the last recorded milking is not plausible. There is also the possibility of directly defining target quantities of milk for respective milking operations of one day.

It is evident from FIG. 2 that the target quantity of milk, which corresponds to the actual milked quantity of milk, decreases in a stepwise manner from the start day until an end of reduction. This is a preferred embodiment of the method. It is not imperative that a reduction in the target quantity of milk takes place from day to day. For example, in the event of the captured quantity of milk not being saved or being incompletely saved, the following milking operation is continued with the last target quantity of milk. The change value M can also be variable, for example with the result that the change value M becomes smaller in the course of the lactation. This means that the difference between the target quantities of milk of successive days becomes smaller.

During the milking operation, the milked quantity of milk is captured. If the captured quantity of milk is ascertained in a teat-specific manner, it is also possible to adjust the target quantity of milk in a teat-specific manner.

The target quantity of milk is reduced up to a specified end of reduction. Between the end of reduction and an end day, which is before the dry-off day, milking is preferably carried out with a constant target quantity of milk. The end of reduction and the end day are preferably adjusted depending on the gestation period of the animal. The end day should be just before the planned dry-off day. Between the end day and the dry-off day, the animal is completely milked dry. This is to ensure that the udder has been milked empty before dry-off. This is especially expedient when a "sealing" substance is being introduced into the udder. Preferably, the animal is completely milked dry two to three times between the end day and the dry-off day to ensure that milk production has actually reduced. The quantity of milk captured in the case of a complete milking operation can also be used as a verification of the effectiveness of the procedure with the target quantity of milk. Depending on what actual quantity of milk is present in the complete milking operation, it is possible to make an adjustment of the change value M for the relevant animal, animal group or herd.

This procedure has especially the advantage that udder health is increased. The use of antibiotic dry-off preparations can substantially be avoided.

It is evident from what is depicted in FIG. 2 that a large rise in the milk production of the animal can be observed at the start of the lactation. In this early lactation phase, in which the colostrum is also present, the energy demand of the animal is very high. The colostrum, or also called beestings, is regarded as nonmarketable milk in numerous countries. It is therefore not imperative that a high level of milk production commences from the day of calving. It would be desirable if the high level of milk production sets in after the end of the colostrum period at the earliest, which would usually be the case from the fifth lactation day in cows.

In the early lactation, the energy demand of the animal is very high for the strong rise in milk production and may in some circumstances not be covered by the feed ingested. To reduce the risk of ketosis, milk production is limited.

What has been shown above is that the target quantity of milk is reduced from a start day. The method is also advantageous in the start phase of the lactation. With the calving, i.e., from the zeroth lactation day or a later day, the animal is milked with a target quantity of milk, wherein an increase in the target quantity of milk is made on each further day. The increase in the target quantity of milk can, for example, be a specific, adjustable percentage of the previous-day value. There is also the possibility of effecting the increase by a specific amount. The increase depending on the lactation state can be constant or else variable.

The method for milking an animal with a reduced target quantity of milk can also be carried out for a curbing of milk production during lactation. For example, if it has been determined that the food intake of the animal is abnormal or that the animal is to be milked with a reduced target quantity of milk for other reasons, it is possible to carry out milking with a reduced target quantity of milk during the lactation of the animal from a start day up to a specified end of reduction. The method according to the invention achieves a gentle milking of an animal.

Furthermore, antibiotic dry-off preparations can be essentially dispensed with. The state of health of the animal is increased by the method according to the invention.

The invention claimed is:

1. A method for milking a milk-producing animal, the method comprising the steps:
   determining a start day and a dry-off day, wherein the start day is before the dry-off day; and
   beginning on the start day, actively introducing involution of a mammary gland in the milk-producing animal by:
      determining a target quantity of milk that is smaller than a possible quantity of milk to be expected from milking the milk-producing animal, wherein the target quantity of milk is calculated from $$ZMM = TZM * (S/24),$$

wherein ZMM is the target quantity of milk, TZM is a daily target quantity of milk, and S is a time interval of hours between two successive milking operations;
   carrying out a milking operation;
   ascertaining a milked quantity of milk during the milking operation;
   comparing the milked quantity of milk with the target quantity of milk; and
   ending the milking operation when the milked quantity of milk substantially corresponds to the target quantity of milk.

2. The method of claim 1, in which the step of determining the target quantity of milk is ascertained from historic data.

3. The method of claim 1, in which the step of determining the target quantity of milk is ascertained in an animal-specific manner.

4. The method of claim 1, in which the step of determining the target quantity of milk is performed again for each subsequent milking operation.

5. The method of claim 1, in which the step of determining the target quantity of milk is performed each day.

6. The method of claim 1, and further comprising the step of:
   identifying the animal to be milked before the step of carrying out a milking operation.

7. The method of claim 1, in which the step of determining a target quantity of milk includes the step of:
   matching the target quantity of milk to a target quantity of milk in a preceding milking operation when there is no data or incomplete data about the milked quantity of milk of the previous milking operation.

8. The method of claim 1, in which the step of determining a target quantity of milk includes the step of:
   assuming a daily target quantity of milk when a previous milking operation recorded does not have a plausible time interval.

9. The method of claim 1, in which the start day is determined at least in part on a planned dry-off day for the milk-producing animal.

10. The method of claim 9, in which, at least from a day following the start day, a target quantity of milk is determined at least in part on a period of time between the start day and the dry-off day.

11. The method of claim 9 and further comprising the steps of:
   carrying out subsequent milking operations with a target quantity of milk up to an end day, which is before the dry-off day; and
   milking the milk-producing animal completely dry at least once in a period of time between the end day and the dry-off day.

12. The method of claim 1, in which, at least from a day following the start day, the method further comprises the step of:
   changing a target quantity of milk by a change value M from a reference quantity.

13. The method of claim 12, in which the change value M is constant.

14. The method of claim 12, in which the change value M is a variable depending on a period of time between the start day and the dry-off day or a lactation state or both.

15. The method of claim 12, in which the change value M is animal-specific.

16. The method of claim 12, in which the change value M is teat-specific.

17. A milking apparatus comprising:
a milking device;
an animal identifier;
a milk collector; and
a milking device controller in communication with the milking device, and programmed to:
determine a start day and a dry-off day, wherein the start day is before the dry-off day; and
beginning on the start day, actively introduce involution of a mammary gland in the milk-producing animal using a target quantity of milk that is smaller than a possible quantity of milk to be expected from the milk producing animal in a milking operation by:
activating the milking device to carry out a milking operation on the milk producing animal;
measuring a milked quantity of milk in the milk collector during the milking operation;
comparing the milked quantity of milk with the target quantity of milk; and
activating the milking device to end the milking operation when the milked quantity of milk substantially corresponds to the target quantity of milk, wherein the target quantity of milk is calculated from $$ZMM=TZM*(S/24),$$

wherein ZMM is the target quantity of milk, TZM is a daily target quantity of milk, and S is a time interval of hours between two successive milking operations.

18. The milking apparatus of claim 17, wherein the milking device controller comprises:
a memory containing a computer program stored therein; and
a digital processor in communication with the memory.

19. A milking apparatus controller programmed to:
determine a start day and a dry-off day, wherein the start day is before the dry-off day; and
beginning on the start day, actively introduce involution of a mammary gland in a milk-producing animal by:
setting a target quantity of milk that is smaller than a possible quantity of milk to be expected in a milking operation, wherein the target quantity of milk is calculated from $$ZMM=TZM*(S/24),$$

wherein ZMM is the target quantity of milk, TZM is a daily target quantity of milk, and S is a time interval of hours between two successive milking operations;
activating a milking device to carry out a milking operation and collect a milked quantity of milk in a milk collector;
measuring the milked quantity of milk in the milk collector;
comparing the measured milked quantity of milk with the target quantity of milk; and
activating the milking device to end the milking operation when the milked quantity of milk substantially corresponds to the target quantity of milk.

20. The milking apparatus controller of claim 19, and further comprising:
a machine-readable storage medium on which the programmed steps are saved.

* * * * *